(12) United States Patent
Hirshman et al.

(10) Patent No.: US 11,216,737 B2
(45) Date of Patent: Jan. 4, 2022

(54) ARTIFICIAL INTELLIGENCE GUIDED RESEARCH AND DEVELOPMENT

(71) Applicant: Uncountable Inc., Sunnyvale, CA (US)

(72) Inventors: Jason Isaac Hirshman, San Francisco, CA (US); Noel Hollingsworth, San Francisco, CA (US); Will Tashman, San Francisco, CA (US)

(73) Assignee: Uncountable Inc., San Francisco, CA (US)

( * ) Notice: Subject to any disclaimer, the term of this patent is extended or adjusted under 35 U.S.C. 154(b) by 811 days.

(21) Appl. No.: 16/104,774

(22) Filed: Aug. 17, 2018

(65) Prior Publication Data

US 2019/0057313 A1 Feb. 21, 2019

Related U.S. Application Data

(60) Provisional application No. 62/547,723, filed on Aug. 18, 2017.

(51) Int. Cl.
| | |
|---|---|
| *G06N 5/04* | (2006.01) |
| *G06N 3/12* | (2006.01) |
| *G06N 20/10* | (2019.01) |
| G06N 20/20 | (2019.01) |
| G06N 3/08 | (2006.01) |
| G06N 7/00 | (2006.01) |

(52) U.S. Cl.
CPC ............ *G06N 5/04* (2013.01); *G06N 3/126* (2013.01); *G06N 20/10* (2019.01); *G06N 3/084* (2013.01); *G06N 7/005* (2013.01); *G06N 20/20* (2019.01)

(58) Field of Classification Search
None
See application file for complete search history.

(56) References Cited

PUBLICATIONS

Egeberg, Optimal Design of Validation Experiments for Calibration and Validation of Complex Numerical Models, Masters Thesis, Clemson University, 2014, pp. 1-102 (Year: 2014).*
Lieder, Beyond bounded rationality: Reverse-engineering and enhancing human intelligence, Doctoral Thesis, University of California, Berkeley,2018, pp. 1-476 (Year: 2018).*

* cited by examiner

*Primary Examiner* — Wilbert L Starks
(74) *Attorney, Agent, or Firm* — Fenwick & West LLP

(57) ABSTRACT

Recommendations for new experiments are generated via a pipeline that includes a predictive model and a preference procedure. In one example, a definition of a development task includes experiment parameters that may be varied, the outcomes of interest and the desired goals or specifications. Existing experimental data is used by machine learning algorithms to train a predictive model. The software system generates candidate experiments and uses the trained predictive model to predict the outcomes of the candidate experiments based on their parameters. A merit function (referred to as a preference function) is calculated for the candidate experiments. The preference function is a function of the experiment parameters and/or the predicted outcomes. It may also be a function of features that are derived from these quantities. The candidate experiments are ranked based on the preference function.

20 Claims, 6 Drawing Sheets

Step 1: Set Performance Goals

Bookmarks ▼

| | | Priority → 210 | Goal Type → 220 | Threshold → 230 | Goal → 240 |
|---|---|---|---|---|---|
| Mechanical | + Add Measurement | | | | |
| Elongation at Break | Show Details | Low | Maximize | 70 | 80 |
| Tear Strength | Show Details | Low | Maximize | 80 | 90 |
| Compression Set | Show Details | Low | Maximize | 90 | 10 |
| Modulus of Elasticity | + Add Measurement | | | | |
| Modulus of Elasticity | Show Details | High | Maximize | 80 | 90 |
| Modulus of Elasticity (Post HT) | Show Details | Low | Maximize | 70 | 75 |
| Derived Outputs | + Add Measurement | | | | |
| Price | | Medium | Minimize | 0.732 | 0.65 |

+ Add Category    ↑↓ Sort

FIG. 2

ARTIFICIAL INTELLIGENCE GUIDED RESEARCH AND DEVELOPMENT

CROSS-REFERENCE TO RELATED APPLICATION(S)

This application claims priority under 35 U.S.C. § 119(e) to U.S. Provisional Patent Application Ser. No. 62/547,723, "Artificial Intelligence Guided Research and Development," filed Aug. 18, 2018. The subject matter of all of the foregoing is incorporated herein by reference in their entirety.

BACKGROUND

1. Technical Field

This disclosure relates generally to artificial intelligence used to recommend experiments, for example for materials or process development.

2. Description of the Related Art

Industrial research and development teams are often tasked with developing a new material or process that meets a specific set of specifications or goals. An experimenter will run experiments that try different combinations of process parameters and compositions of ingredients. The experimenter will choose a set of experiments based on his experience, intuition, and research with the hope that the results of the experiments will meet the goals. To guide his choice of experiments, an experimenter may rely on design of experiments methods that set up a series of experiments to be tested that systematically try a variety of combinations of the experimental parameters of interest.

Oftentimes, the lists of goals and adjustable experimental parameters are long and diverse, and it may not be clear how to incorporate or prioritize all the different combinations to be tried. Traditional design of experiments techniques often assume linear relationships between inputs and set up orthogonal arrays of experiments that will not discover intricate, non-linear interactions between input parameters. Moreover, these techniques insufficiently handle high-dimensional problems with many experimental parameters. Experimenters often run sequences of experiments with many of the experimental parameters held fixed based on their own guesses for which parameters will matter most. This approach eschews statistical modeling in favor of experimenter intuition and results in a haphazardly selected set of experiments that may not adequately test enough variations of parameters.

Thus, there is a need for a better approach to the design of experiments.

SUMMARY

The present invention overcomes the limitations of the prior art by generating recommendations for new experiments via a pipeline that includes a predictive model and a preference procedure.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

FIG. 2 is a screenshot of an example form for an experimenter to enter experiment goals and priorities.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1:
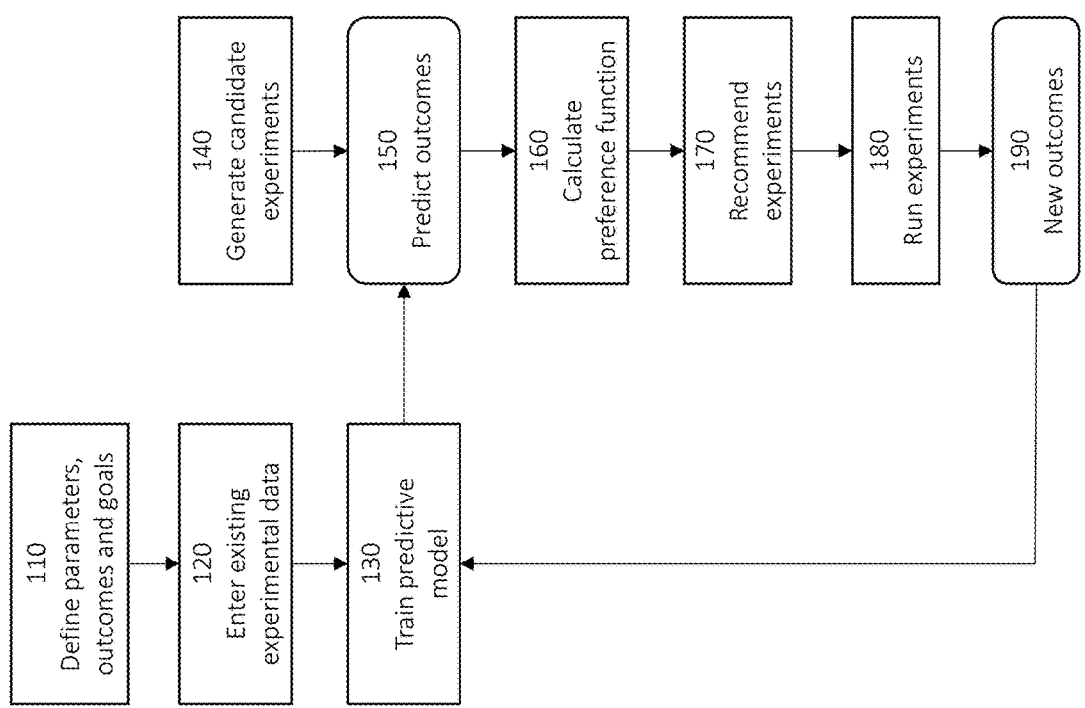
FIG. 1 is a flow diagram of a development testing loop according to an embodiment.

A preferred embodiment includes a multi-component software system with which an experimenter interacts. FIG. 1 outlines the steps of one example of a development testing process that a development team might use. Information about the development task is entered 110. This may include a definition of the development task, such as the experiment parameters that may be varied, the outcome variables and the desired goals or specifications. Existing experimental data is also entered 120 into the software system. The software system uses machine learning algorithms to train 130 a predictive model using that data. The software system generates 140 candidate experiments and uses the trained predictive model to predict 150 the outcomes of the candidate experiments based on their parameters. A merit function (referred to as a preference function) is calculated 160 for the candidate experiments. The preference function is a function of the experiment parameters and/or the predicted outcomes. It may also be a function of features that are derived from these quantities. The candidate experiments are ranked 170 based on the preference function. The experimenter runs 180 the experiments from the recommendation list. Optionally, the outcomes 190 may be reported back to the software system for further training 130.

In the preferred embodiment, the experimenter submits information about the development task into a web platform. In an alternative embodiment, similar information may be collected in a spreadsheet and emailed.

FIG. 2 is a screenshot of one example of a user interface form to submit information about the goals for the development task. The experimenter adds various goals to create rows in the interface. In this example, the goals are for measurements that are made after an experiment is run. The experimenter can select a priority 210 for each goal. Here, the choices for priorities are "High," "Medium," "Low," and "Ignore." The "Ignore" option allows the goal to be ignored when generating experiments. The other three options provide a simple scale from which the experimenter can choose. An alternative embodiment might have a numerical value for priority that provides more complex choices.

In the next column, the experimenter can specify the goal type 220. Possible options that might be included here include the following. "Maximize" means the goal is to maximize the outcome. "Minimize" means the goal is to minimize the outcome. "Range" means the goal is to fall within a specified range. "Target" means the goal is to be as close as possible to a particular target.

The "Threshold" value 230 is the requirement. The outcome must meet this value in order to meet the specification. The experimenter may also provide an additional optimistic "Goal" 240 that provides some indication of the scale of the measurement. One way to think of the scale is the difference between the required threshold 230 and an optimistic goal 240. An alternative embodiment might ask for a scale directly. The scale is important to be able to prioritize changes in different outcomes. For example, it may provide a way to compare a change of one dollar in price with a change of one degree in melting temperature. In another possible embodiment, the scientist may work with a third-party data scientist to communicate the information, and then the data scientist may fill out the same information in a spreadsheet.

Figure 3:
FIG. 3 is a screenshot of an example form for an experimenter to enter experiment parameters and constraints.

FIG. 3 is a screenshot of an example form for an experimenter to enter experiment parameters and constraints. This example is for experiments to optimize a material formulation and/or material processing. FIG. 3 shows three sections. The first section lists the "Formulation Ingredients" 310. This form collects information on ingredients that may be included in a material development task. Ingredients are listed in each row and grouped by category. In this example, for each ingredient, the experimenter provides a minimum and maximum amount 320 that can be used in a formulation. Here, these quantities may represent either parts per hundred of the quantity of one of the categories or weight percentages.

The second section in FIG. 3 is for entry of information about process parameters and other stand-alone parameters that are not ingredients in a formulation 330. For every parameter defined in the first two sections, the experimenter may elect to merge that parameter with another via the "Treat As" selection 340 or ignore it for the purposes of modeling and generation. This "Treat As" option helps to reduce the dimensionality of the experiment parameters that may be varied. During the recommendation process, a parameter that is "Treated As" another parameter may be removed from the vectorized representation of the data. The quantity that used to represent that merged parameter may be added to the parameter it is being treated as. That way, the data for that parameter is still contributing but the dimension of the vector used for representing an experiment is smaller.

The third section in FIG. 3 allows an experimenter to specify constraints 350 on the experiment parameters. For example, the experimenter might require that a parameter always be used in an experiment, that the ratio between two parameters be constrained, that two or more parameters never be used together, that two or more parameters always be used together, or that an arbitrary function of the parameter values be less than or equal to some value. Additionally, not pictured in FIG. 3 is the option for an experimenter to add properties to each parameter. These properties could include the cost of using a parameter, the physical properties such as specific gravity or viscosity of a parameter, or other arbitrary values. It is preferred that these properties be consistent across categories for modeling purposes. In another possible embodiment, the scientist may work with a third-party data scientist to communicate the information, and then the data scientist may fill out the same information in a spreadsheet.

In some embodiments, the experimenter also submits data from previous experiments into a web platform. In an alternative embodiment, the experimenter may send past data via email or another form of electronic communication. The data from those previous experiments (i.e., parameters for the previous experiments and their corresponding outcomes) can now be incorporated into the model. Data from previous experiments is not necessary; however, if there are no previous results, there is nothing to model and candidate experiments may be pseudo-randomly chosen within the constrained experimental space.

In one example of a predictive model, the model takes as input a vector of numbers describing an experiment and produces a vector of predicted outcomes. The vectorized description of an experiment may include both a direct encoding of the parameters of the experiments as well as a set of additional derived features. Including derived features provides more data from which the model can learn. Derived features may include numbers used to compute constraints such as ratios or additional properties such as the total specific gravity or cost of a formulation. Derived features may also include totals across categories, univariate transformations of parameters such as power transforms, multivariate transformations such as parameter products or sums, or other arbitrary functions of the parameters. The derived features may also be based on the outcomes in addition to the experiment parameters.

In one approach, individual machine learning models are used to predict each outcome separately, but an alternative embodiment might have a single statistical or machine learning model. In some cases, a Gaussian process regression model is used to predict each outcome. The kernel of the Gaussian process may be computed as follows:

$$k(x_i, x_j) = \sigma_0 \delta_{i,j} + \sigma_1 k'(\sqrt{\Sigma_l w_l (x_{i_l} - x_{j_l})^2}) \tag{1}$$

where $x_i$ and $x_j$ are two experiment vectors, $\sigma_0$ is a parameter for random experimental noise and allows for matrix invertibility, $\delta$ is the kronecker delta, $\sigma_1$ is a parameter for the variance explained by the stationary kernel, $k'$ is a chosen stationary kernel function, and w is a vector of weights with the same number of dimensions as the experiment vectors. In practice, Matern 3/2 covariance functions work well for $k'$. The parameter w equips k with automatic relevance determination that provides built-in feature selection.

Model training is the process of determining the best values for the model parameters including those that are intrinsic to the stationary kernel. Training may be conducted separately for each model with an optimization procedure applied to the predictive error of the model. One advantage of training separate Gaussian process models is that each prediction comes with an estimate of the standard deviation. When selecting experiments, this standard deviation may be used to create an active learning policy that helps to ensure a variety of experiments. The standard deviation may be used to create an upper confidence bound. Alternative embodiments might use expected improvement or other solutions in the stochastic multi-armed bandit problem literature. In an alternative embodiment, one might choose to use a different type of model such as neural networks, decision trees, kernel ridge regressions, linear regressions, or an ensemble of many models.

Figure 4:
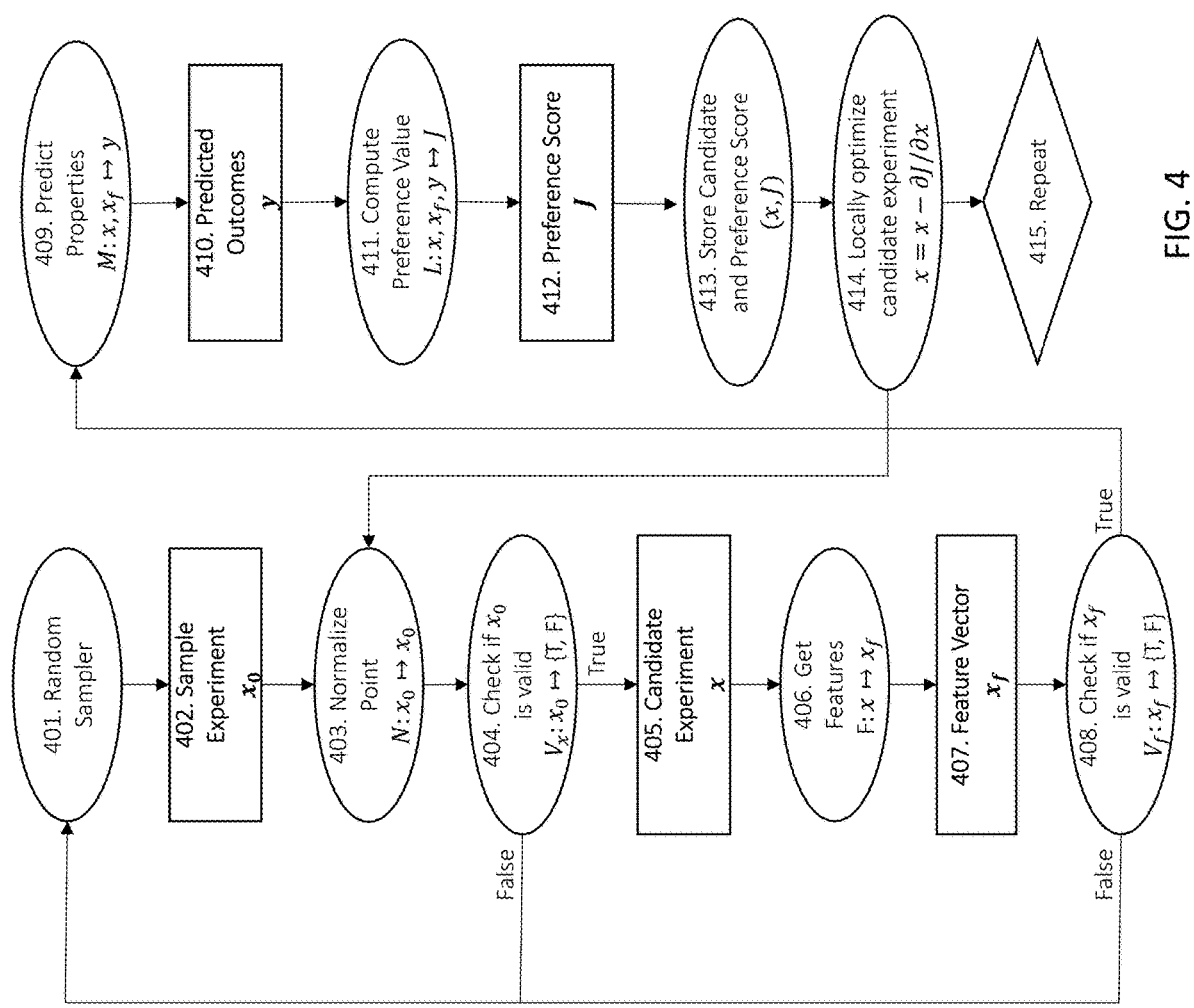
FIG. 4 is a flow diagram of an artificial intelligence-guided experiment generation process.

FIG. 4 is a flow diagram of one implementation of steps 140-170 of FIG. 1. Thousands of candidate experiments are randomly generated. Predictions of their outcomes are made. The predicted outcomes are combined via a preference function into a single score. The candidates are ranked and the ones with the highest score may be chosen for actual implementation. Each step is explained in detail below.

A pseudo-random sampler 401 is employed to generate sample experiments. An alternative embodiment might use a different search procedure to cover the allowed experiment space. One version uses a scrambled Halton sequence as the sampler because of its digital net properties. The sampler returns vectors in the unit hyper-cube. Those vectors are transformed using the minimum and maximum constraints provided to have a higher chance of falling within the problem constraints. Some dimensions of the vector may be set to zero randomly if sparsity in the parameters is required.

The sample experiments 402 may be processed one at a time or in batches depending on the dimensionality of the problem. Randomly generated samples may not meet the constraints of the problem. For example, the problem might require that the weight percentages of a formulation add up to 100. In FIG. 4, a normalizing process 403 is used to increase the success rate of the rejection sampling procedure. This normalizing process performs quick operations to ensures additional constraints are met. Alternative embodiments might skip this step and instead accept a higher rejection rate. Sample experiments are checked 404 against constraints including the ones that were entered into the web platform or communicated by the experimenter. Candidates that do not meet the constraints are thrown out. The remaining candidates are considered to be valid candidates 405 for experimentation.

Derived features can then be computed 406 for the remaining candidates. The derived features are concatenated together to produce a feature vector 407. These features are checked 408 against any constraints on the features. Typical constraints might include limiting the cost of a set of parameters, limiting the total amount of a category, and limiting the total number of non-zero parameters in a category. Passing candidates are encoded 409 in vectors to be fed into the model. The model predicts 410 a vector of outcomes.

To compare proposed experiments, a preference function is created that incorporates the data for an experiment and its predicted properties. This function takes as input the experimental parameters, the derived features, and the predicted outcomes and outputs a single score. In one approach, the preference function is additive, borrowing from additive utility functions in economic theory. Each additive component is weighted according to the priority of the goal and is shaped according to the goal quantity and type. For example, the additive components may be negative exponentials and transformed such that they equal ten times a priority weight when the outcome is at the threshold and zero at the goal. This multiplicative transformation allows the preference function to be dimensionless and not dependent on units of measure. Two different additive components may be used for range and target goal types to create a bowl-like shape around the goal region. In alternative embodiments, different preference functions may be used such as squared error to a set of goals, linear additive utilities, quadratic additive utilities, or logarithmic additive utilities. The experiment parameter vector, feature vector, and outcome vector are fed into the preference function 411 resulting in a preference score 412 for the candidate experiment. This preference function provides a method for ranking past and candidate experiments according to their desirability to the experimenter. The inclusion of derived features as a parameter to this function allows for cost and other properties to be a consideration for that ranking.

Experimental variability and model uncertainty can be incorporated into the preference function by using a Monte Carlo procedure to sample over many different outcome conditions using the distributional estimates from a Gaussian process or another machine learning model. The preference function is applied to each sampled outcome to get a distribution of preference function values. To collapse the distribution into a single value, one may simply consider the average, or apply an active learning procedure to extract, for example, a percentile of that preference distribution or an expected value of a portion of it. These collapsed values can then be used as the preference values for the purpose of comparison.

Once a preference function value is computed for the candidate experiment, it can be stored 413 in a list of other candidates. To further optimize the candidate, a local optimization procedure 414 can be run to make slight adjustments. Back propagation may be used to compute the derivative of the preference function with respect to the candidate experiment and then use a gradient descent procedure to make adjustments. The adjusted experiment can be sent back through the entire pipeline starting with the normalization step. This whole sampling process is repeated thousands of times to develop a list of candidate experiments. The candidate experiments with the smallest preference score are returned to the experimenter. In order to ensure that the experiments vary appropriately, a batch of experiments may be constructed one-by-one each time re-computing the upper confidence bound preference score after including a lower confidence bound prediction of previously chosen experiments as data in the predictive model.

The experimenter run the selected experiments and reports back the results. In one implementation, the system performed well after only three iterations of testing. Each iteration usually involved testing between eight and twenty experiments.

Figure 5:
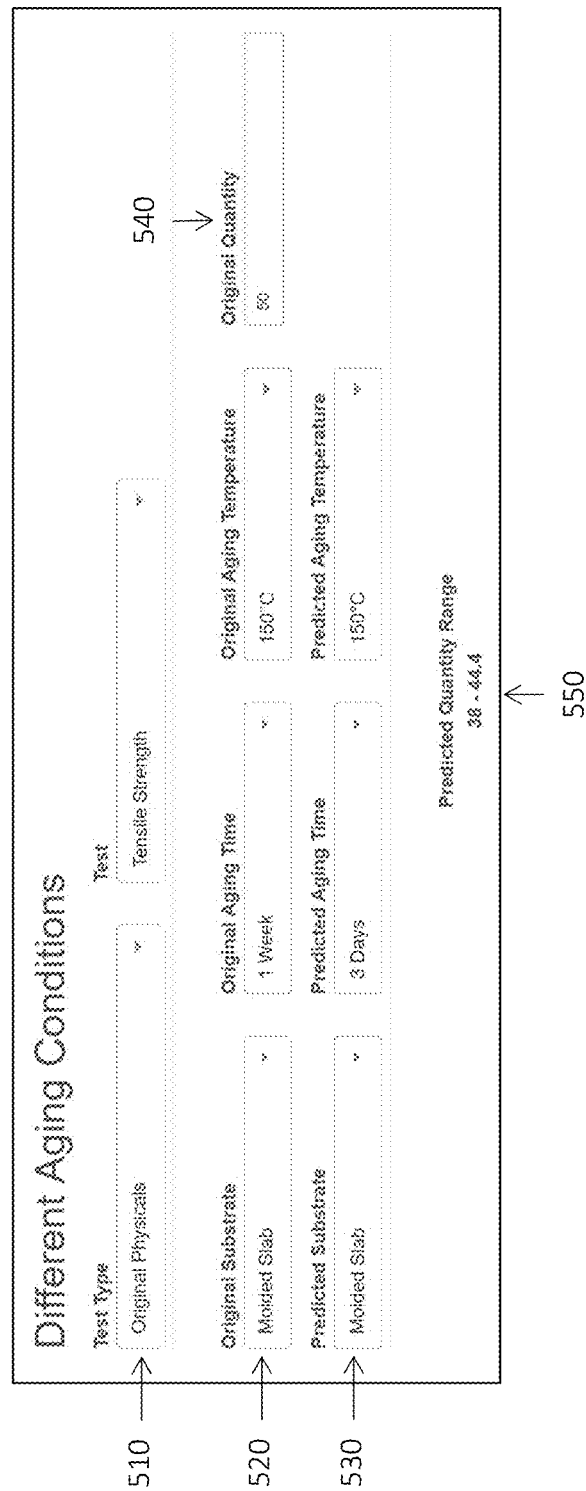
FIG. 5 is a screenshot of a user interface for predictions to translate between testing conditions.

The software system may make various interfaces available to the experimenter for the experimenter to conduct his or her own analysis. One possible interface is one that allows an experimenter to predict how a test result under one testing condition will translate to a result under a different testing condition. FIG. 5 shows an example. In this interface, the experimenter selects the type of experiment 510 that is being run. The experimenter can select the original conditions 520 for the experiment, including properties like the substrate the experiment was conducted on, how long the material was aged for and at what temperature. The experimenter can select the same parameters 530 for the conditions for which he or she desires a prediction. The experimenter also enters the outcome 540 under the original condition—the field labeled "Original Quantity" in the preferred embodiment. The interface will then display in either text or graphical format a prediction 550 for the range of values under that new experimenting condition. A plot may also be displayed showing the prediction function with the original quantity on the x-axis and the predicted quantity on the y-axis. In some implementations, the predictions are made using a machine learning model such as a linear regression or a Gaussian process.

Figure 6:
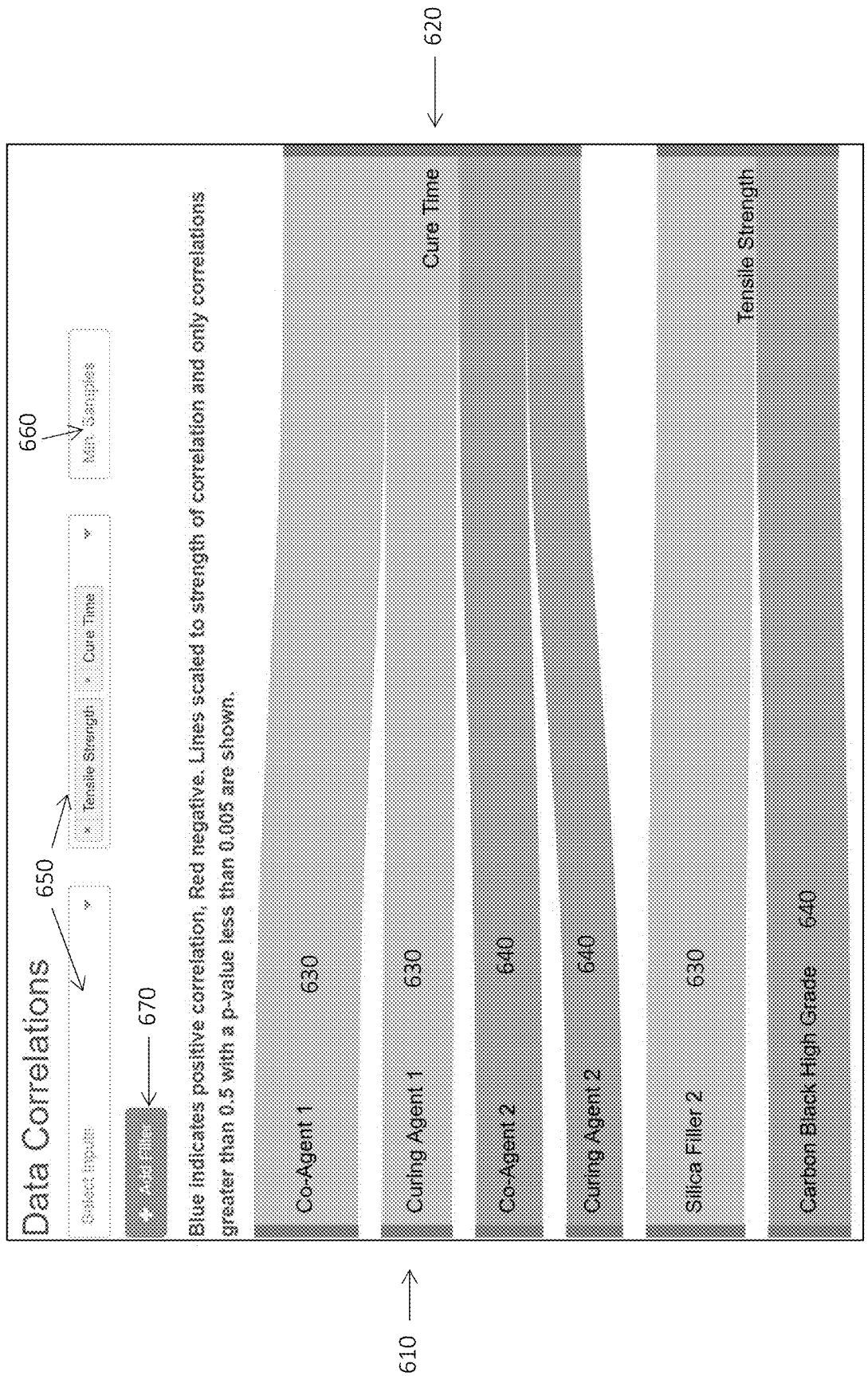
FIG. 6 is a screenshot of a user interface to analyze correlations in a data set.

Another interface may allow an experimenter to view correlations across inputs (experiment parameters) and outputs (outcomes) in the experiment data set. FIG. 6 shows a screenshot of an example. Experiment parameters 610 are listed on the left, and outcomes 620 are listed on the right. They are connected in a Sankey diagram where connections 630 represent positive correlations and connections 640 represent negative correlations. The polarity (positive or negative correlation) may be represented by different colors. The width of each connection is proportional to the absolute value of the Pearson correlation between the parameter and the outcome across the dataset. In this example, only correlations above both a threshold of 0.5 and with a p-value of less than 0.005 according to a statistical hypothesis test are displayed. In an alternative embodiment, different cutoffs might be employed to show more or fewer correlations. The experimenter may select inputs and outputs at the top 650 of the interface to ensure that only those inputs and outputs are shown, enter in a number for the minimum number 660 of samples for a correlation to be displayed, and add filters 670 so that the correlations are calculated only on data points that meet various criteria. Clicking on one of the Sankey diagram connections brings the experimenter to a scatter plot with the parameter on the x-axis and the outcome on the y-axis. In an alternative embodiment, an interface may also allow an experimenter to view correlations between different parameters or between different outcomes as well.

Additional interfaces may be included in the software. Examples include an interface that allows users to see scatter plots for multiple parameters and outcomes, an interface that shows formulations side-by-side in a spreadsheet style view, and an interface that allows the user to query for particular sets of formulations by parameter and outcome values. By having the experimental data in this software, entire teams of scientists can collaborate using the same data. Multiple scientists can use the software at the same time from different web browsers.

The software allows for detailed information to be entered about each experiment. In some embodiments, a user may be allowed to enter a material lot that an ingredient came from when running that particular experiment. A material lot may have metadata data associated with it including, for instance, its date of purchase, specifications provided by the supplier, and freeform notes. A user may also add notes to an experiment or additional process parameters to associate structured metadata with the experiment, such as which machine the experiment ran on, what date the experiment was run, or what operator ran the experiment. A user may enter multiple measurements for each outcome. In the preferred embodiment, the software automatically computes the mean and standard deviation for each set of measurements.

An example application is for a rubber development process. The goal of the process may be to match a specification sheet that lists a variety of properties. Past data may include experiments that were run in the past for a similar application. Ingredients may include a set of polymers, oils, carbon black fillers, silica fillers, processing aids, curatives, and other additives. The parameter vectors for the model, each of which represents a formulation, may be set up as a list of weight percentages or parts per hundred parts polymer of each ingredient with zeros when an ingredient is not present. Process parameters such as cure time, cure temperature, and number of mixing passes may be appended to the vector. Derived features might include the total amount of filler, the ratio of filler to processing aids, the weighted average molecular weights of the polymers, the raw material cost of the compound, the cost of the compound at the predicted density, and the count of the number of polymers included. Possible measurements that will be predicted by the predictive model and incorporated into the preference function may include rheology data, cure rate, elongation, tensile strength, and elastic modulus. The preference function may be constructed so that it achieves a value of zero if and only if all the measurements satisfy the required specifications.

A special case of the rubber development process is the development of rubber compounds for tires. For tire development, ingredients may include may different types of rubber compounds such as natural and synthetic rubber as well as other ingredients like fillers, processing aids, and curatives. Outcomes could include measuring the tread of the tire, the degree of wear on the tire, and the grip of the tire in different environmental conditions.

Another example use could involve optimizing process parameters on a factory line that produces parts or during a chemical production process. The goal may be to reduce defects, increase throughput, and/or increase part quality. Past data may include defect and scrap counts for the line run at different speeds. Process parameters may include line speed, temperatures of various stages of the line, and physical and chemical properties and dimensions of parts or batches on the line. The parameter vector may directly list the various process parameters that can be changed. The outcomes to be predicted may include scrap and defect percentages. Different types of defects may be considered as different outcomes. The preference function may be constructed so that it trades off throughput with defect rates.

Another example use case is for experimentation for drug development. In one potential embodiment, the experiments might be recommended for optimizing drug delivery and stability. Potential types of drug delivery and stability use cases could include drugs that are administered via injection such as intravenous, intramuscular, or subcutaneous injections or orally with a pill. In each case, potential parameters include the formulation for the fluid or substance used as a vehicle for the active ingredient to be delivered as well as parameters that describe the physical mechanism of delivery. Special attention might be placed on the biochemical properties of the ingredients included. Derived features could include the pKa of each ingredient and molecular weight and other stoichiometric considerations. Potential outcomes could include the viscosity, pH, concentrations of various ions, stability in different temperature conditions, resulting concentration of the active ingredient, and pain caused by administration of the drug. The goal might be for some of the properties to be as close to the body's homeostasis levels to prevent side effects. An alternative application to drug development could include focus on the manufacturing process to scale up production of a drug. This application would entail optimizing with various process parameters as parameters and product yields, defect rates, and throughputs as outcomes.

A further example use case is for experimentation for consumer product development. Consumer products could include health products like sunscreen, consumable products like food and beverages, and cosmetics like lipstick or perfume. For consumer products, there might be very tight cost constraints or a desire for the preference function to put a lot of weight on cost as a feature derived for the formulation of the product. Experiments for consumer products could include testing new formulations and compositions or new production processes for manufacturing. Consumer products may have constraints based on the desire to market a product a certain way—they may need to include a certain percentage of some ingredient to qualify as a particular type of product for legal or marketing reasons such as "fat-free" or "all-natural." The outcomes for consumer products might include predictions for consumer preferences. Lab measurements made in a lab could be used as a proxy for consumer preferences. Using past consumer preference studies, one could statistically determine a relationship using a regression or some other means between consumer preferences and lab measurements. Then the predicted consumer preferences could be included in the preference function for the candidate experiments rather than the lab measurements directly. By incorporating the consumer preferences, experiments may be recommended to optimize for future market performance rather than concrete scientific metrics.

In some embodiments, experiments may be run in a high-throughput manner. In these cases, experiments are run quickly in large batches and may be automated. In a possible embodiment, a high-throughput experiment system might communicate electronically with software that can recommend experiments automatically as the high-throughput system completes each run.

As an additional example, the experiments could be for the development of new paint or color matching. For paint, outcomes could include the viscosity of the paint, the application feel, and the color. For purposes of predictions for the color of the paint or color matching in other contexts, color might be represented as LAB values or RGB values or both. The preference function might either incorporate those values directly or be set to use a delta E calculation which provides a single number to describe differences between colors. Other properties of the color of the paint might be used such as measured color under different illuminations or angles or the metamerism of the paint. The experiment parameters might be the quantity of ingredients added to the paint including possibly a base component, color additives, and processing aids.

Although the detailed description contains many specifics, these should not be construed as limiting the scope of the invention but merely as illustrating different examples. It should be appreciated that the scope of the disclosure includes other embodiments not discussed in detail above. For example, other embodiments may use alternative machine learning models, sampling algorithms, and active learning procedures. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

Alternative embodiments are implemented in modules in computer hardware, firmware, software, and/or combinations thereof. Implementations can be implemented in a computer program product tangibly embodied in a computer-readable storage device for execution by a programmable processor; and method steps can be performed by a programmable processor executing a program of instructions to perform functions by operating on input data and generating output. Embodiments can be implemented advantageously in one or more computer programs that are executable on a programmable computer system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random-access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and Flash-memory devices; magnetic disks such as internal hard disks and removable disks; magneto-optical disks; and CD-ROM disks. Any of the foregoing can be supplemented by, or incorporated in, ASICs (application-specific integrated circuits), FPGAs and other forms of hardware.

What is claimed is:

1. A method implemented on a computer system comprising a processor, the processor executing instructions to effect a method for recommending candidate experiments, the method comprising
    training a predictive model that predicts outcomes of experiments, wherein the training is based on known outcomes of previous experiments characterized by known parameters;
    generating a number of candidate experiments;
    using the predictive model to predict outcomes of the candidate experiments based on parameters of the candidate experiments; and
    recommending from among the candidate experiments based at least in part on the predicted outcomes.

2. The method of claim 1 further comprising:
    running at least one of the recommended experiments; and
    further training the predictive model based on the outcomes of the recommended experiments.

3. The method of claim 1 wherein recommending from among the candidate experiments comprises:
    calculating values of a preference function for the candidate experiments, wherein the preference function is a function of a derived feature that is derived from the parameters and/or predicted outcomes for the candidate experiments; and
    ranking the candidate experiments based at least in part on the calculated values of the preference function.

4. The method of claim 3 wherein the derived feature is an estimated cost.

5. The method of claim 3 wherein the preference function is monotonic with respect to the derived feature but with a slope of increased magnitude beyond a preselected threshold.

6. The method of claim 3 wherein the preference function is a function only of dimensionless variables that are based on the parameters and/or predicted outcomes for the candidate experiments.

7. The method of claim 3 wherein the derived feature is a variability of one of the predicted outcomes.

8. The method of claim 3 wherein the derived feature is a linear combination of the parameters and/or predicted outcomes for the candidate experiments.

9. The method of claim 1 wherein the predictive model includes a model of a Gaussian process.

10. The method of claim 9 wherein the predictive model includes a model of a Gaussian process with a Matern kernel and automatic relevance determination.

11. The method of claim 1 wherein the predictive model includes a neural network.

12. The method of claim 1 wherein the predictive model includes an ensemble of models.

13. The method of claim 1 wherein the candidate experiments are generated using a quasi-Monte Carlo procedure.

14. The method of claim 1 wherein the candidate experiments are generated pseudo-randomly, the method further comprising:
    improving the pseudo-randomly generated candidate experiments using a local optimization procedure.

15. The method of claim 1 wherein the candidate experiments are generated subject to constraints on a derived feature that is derived from the parameters and/or predicted outcomes for the candidate experiments.

16. The method of claim 1 wherein generating the candidate experiments comprises:
    generating sample experiments; and
    rejecting those sample experiments that do not meet constraints on the parameters for the candidate experiments.

17. The method of claim 1 wherein the candidate experiments are for different formulations of a material or for different process parameters for processing a material.

18. The method of claim 1 wherein the candidate experiments are for one of: optimizing rubber properties, optimizing paint, optimizing food, optimizing drug delivery, optimizing drug stability, optimizing drug production, optimizing production of a material, optimizing process parameters for a manufacturing line, optimizing production of a part, optimizing a product for consumer preferences, or optimizing variations of a product.

19. A non-transitory computer-readable storage medium storing executable computer program instructions to effect a method for recommending candidate experiments, the instructions executable by a processor and causing the processor to perform a method comprising:
    training a predictive model that predicts outcomes of experiments, wherein the training is based on known outcomes of previous experiments characterized by known parameters;
    generating a number of candidate experiments;
    using the predictive model to predict outcomes of the candidate experiments based on parameters of the candidate experiments; and
    recommending from among the candidate experiments based at least in part on the predicted outcomes.

20. A system for recommending candidate experiments, the system comprising:
    a source for producing candidate experiments, the candidate experiments characterized by parameters;
    a predictive model that predicts outcomes of the candidate experiments based on the parameters of the candidate experiments, the predictive model trained on known outcomes of previous experiments characterized by known parameters; and
    a module that recommends from among the candidate experiments based at least in part on the predicted outcomes.

* * * * *